(12) United States Patent
Letang

(10) Patent No.: US 8,232,699 B2
(45) Date of Patent: Jul. 31, 2012

(54) MAGNETICALLY LEVITATING VEHICLE

(76) Inventor: Kyli Irene Letang, Las Vegas, NV (US)

( * ) Notice: Subject to any disclaimer, the term of this patent is extended or adjusted under 35 U.S.C. 154(b) by 0 days.

(21) Appl. No.: 13/350,354

(22) Filed: Jan. 13, 2012

(65) Prior Publication Data

US 2012/0112590 A1  May 10, 2012

(51) Int. Cl.
*H02K 7/09* (2006.01)
(52) U.S. Cl. ...................................................... 310/90.5
(58) Field of Classification Search .................. 310/90.5, 310/152, 154.01, 156.01; 104/281, 304; 180/65.1, 65.51
See application file for complete search history.

(56) References Cited

U.S. PATENT DOCUMENTS

| | | | | |
|---|---|---|---|---|
| 3,260,475 A | * | 7/1966 | Ormsby | 244/166 |
| 3,885,504 A | * | 5/1975 | Baermann | 104/283 |
| 3,911,829 A | * | 10/1975 | Ross et al. | 105/157.1 |
| 3,939,776 A | * | 2/1976 | Ross et al. | 104/23.2 |
| 5,431,264 A | * | 7/1995 | Tseng et al. | 191/10 |
| 5,767,595 A | * | 6/1998 | Rosen | 310/74 |
| 6,983,701 B2 | * | 1/2006 | Thornton et al. | 104/282 |
| 7,007,765 B2 | * | 3/2006 | Waters et al. | 180/19.3 |
| 8,079,435 B2 | * | 12/2011 | Takasaki et al. | 180/68.5 |

* cited by examiner

*Primary Examiner* — Dang Le
(74) *Attorney, Agent, or Firm* — Sinorica, LLC (57) ABSTRACT

The magnetically levitating vehicle includes a frame, a control device, tire chambers, and tires. The frame includes a magnetic shield, a cabin, and an undercarriage. The control device includes a control stick and a mounting system. The control stick includes an accelerator, levitation, and brake button. The mounting system includes a horizontal piece, a vertical and base piece, and push button locks. The plurality of tire chambers includes a plurality of sensor and levitation electromagnet pairs, propulsion electromagnets and permanent propulsion magnets. The vertical piece and horizontal piece both include an inner and outer shaft, the latter of which includes a plurality of holes. The inner shell includes an orientation device, a plurality of permanent levitation magnets and sensor and propulsion electromagnet pairs, a plurality of permanent safety magnets, and an axle. The outer shell includes a tire tread.

15 Claims, 9 Drawing Sheets

MAGNETICALLY LEVITATING VEHICLE

FIELD OF THE INVENTION

The present invention relates generally to vehicles that have the ability to hover. The objective of the present invention is for the car frame to hover above its tires with the use of magnetic levitation.

BACKGROUND OF THE INVENTION

Transportation through magnetic levitation has been a concept that has been theorized for over a century. However, magnetically levitated vehicles have experienced little incorporation into the transportation industry outside of trains. Maglev trains are becoming more common in parts of Asia, while many new projects are underway to expand the technology to the United States and Europe. A magnetically levitating vehicle of the present invention expands the use of magnetic levitation to personal vehicles. Also, the present invention brings a new aspect to magnetic levitation and propulsion by not requiring its own track, as is the case with maglev trains. Thus, it can directly be incorporated into the existing transportation infrastructure.

In today's world, energy consumption and efficiency is a hotly debated topic. The present invention addresses concerns regarding energy and fossil fuel consumption in the transportation industry. Also, the present invention does not use or contain a combustion engine and is powered solely through electricity. This reduces the impact the present invention has on the environment and is concurrent with the needs of the future.

DETAIL DESCRIPTIONS OF THE INVENTION

All illustrations of the drawings are for the purpose of describing selected versions of the present invention and are not intended to limit the scope of the present invention.

A magnetically levitating vehicle is designed to levitate while completing the same tasks traditional cars are required to do. To maneuver the vehicle successfully, the present invention consists of multiple components that each serve to add functionality to the present invention. These components include a levitation system, a control system, a propulsion system, a tire safety system, and an electromagnetic shielding system. The present invention uses magnetic properties to perform its purpose. Thus, the present invention requires no fuel to run and operate. The present invention operates with the use of a magnetic sensing system that is powered with rechargeable batteries. To hover above its own tires, the present invention contains a levitation system that is maintained through interactions between the car and the tire. To turn, the present invention uses its propulsion system to carry out inputs from the control system. Also, it implements a tire safety system to ensure that the tires remain in proper position while driving. Another safety precaution taken is a shielding system that helps to ensure the many magnetic fields involved in moving and guiding the present invention does not become unmanageable or interfere with other magnetic devices in the car (i.e. cell phones). The various components of the present invention are separate systems that work to create a successfully hovering and moving magnetic car.

Figure 1:
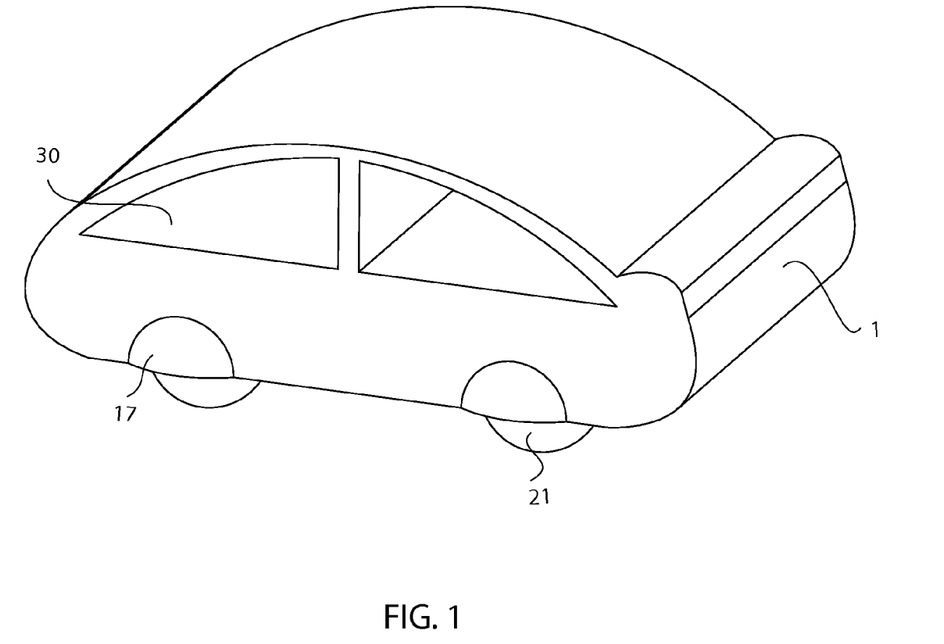
FIG. 1 is a perspective view of the present invention.
Figure 2:
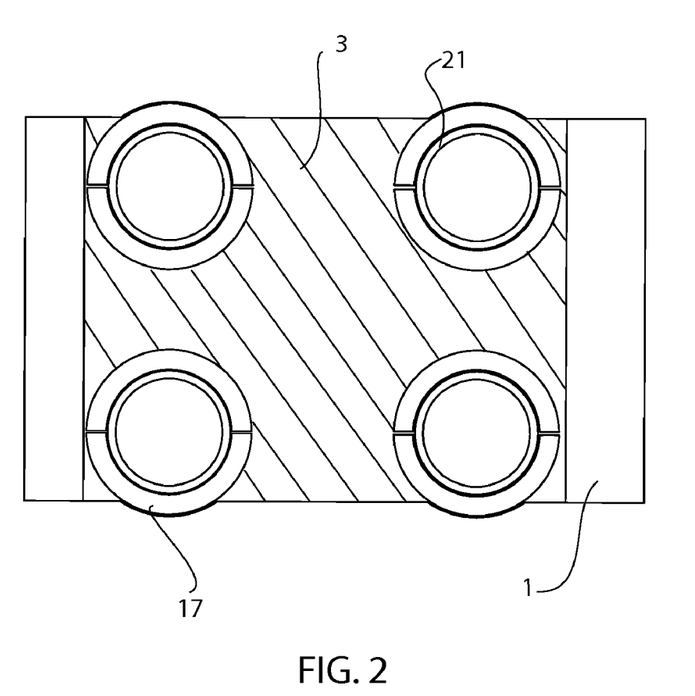
FIG. 2 is a bottom plane view of the present invention.
Figure 3:
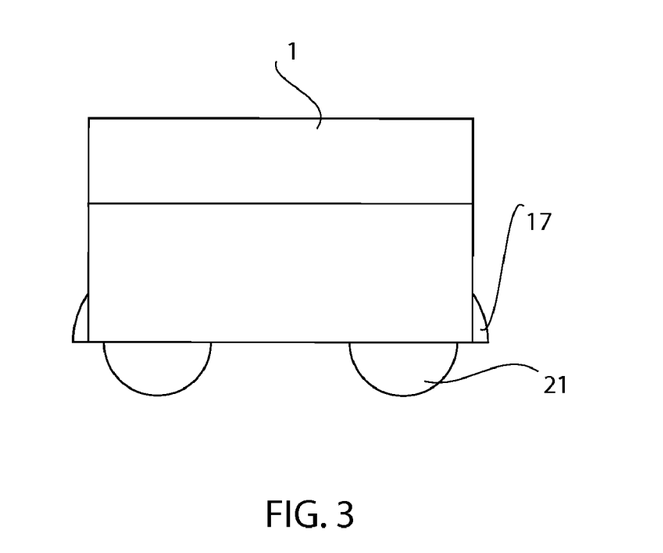
FIG. 3 is a back side view of the present invention.

In reference to FIG. 1, FIG. 2, and FIG. 3, the frame 1 of the present invention is similar in shape to traditional vehicles. However, a major difference in the design is seen in its unique plurality of tire chambers 17. Traditionally, cars have exposed wheel wells on both the left and right sides, which mark the position of each of the four tires. The plurality of tire chambers 17 are similar in shape to hemispheres, which protrudes past the surface of the present invention's body to protect the plurality of tires 21. Also, the tire chambers 17 are created so that the plurality of tires 21 can be safe-guarded from any debris or interference from the environment that could cause a disturbance to the magnet sensor system within the present invention. The plurality of tires 21 and tire chambers 17 house many of the parts that ensure the proper functioning of the present invention. Therefore, it is important that the plurality of tires 21 is protected. The plurality of tires 21 fit into the plurality of tire chambers 17, such that only a small portion of the tires 21 are exposed. As a result, the pluralities of tires 21 are sufficiently protected in all situations.

Referring to FIG. 1, FIG. 2, FIG. 3, and FIG. 4, the plurality of tires 21 are radically different from traditional tire shapes. Instead of using a conventional tire design, the present invention has a plurality of tires 21 that are shaped as spheres. The tires 21 are able to rotate in a 360° motion which allows for easier turning and steering. The lack of restriction on the rotation of the tires 21 also means the present invention can travel in any direction. Traditionally, tires consist of a metal inner rim and are screwed to the tire with various nuts and bolts. The entire assembly is then covered with a hub cap. In many cases, hubcaps can be lost (if a tire hit a curb of a road) and the screws can then be left unprotected and start to develop rust. The present invention's plurality of spherical tires 21 avoid all of these problems because none of the metal components have the slightest possibility of being exposed to air for continuous amounts of time. The tires 21 have a tire tread 29 on the outside surface to provide traction and control, and a closable access point to the inside of the tires 21.

Referring to FIG. 2, the tires 21 are spherical, and have a chance of rolling away, especially when the car is parked on an uphill or downhill slope. Therefore, the frame 1 is designed to rest atop the tires 21 when the vehicle is put in park. As a result, the chambers 17 encase the tires 21, trapping it inside, and preventing it from rolling out of the car. Also, to ensure that the frame 1 does not slide itself, there is an undercarriage guard 3 which is attached to the underneath the frame 1. The undercarriage guard 3, is manufactured from rubber in the present design, and comes into contact with the surface of the road when the vehicle is parked, creating a frictional force to prevent sliding.

Referring to FIG. 1, FIG. 2, FIG. 4, and FIG. 5, another unique aspect to the tires' 21 design is that they contain two layers: an inner shell 22 and outer shell 28. The inner shell 22 is located inside the outer shell 28; in between the surfaces of the two shells is air. Inside the inner shell 22 is an orientation device 23, in the present design, a gyroscope is used to maintain the proper orientation and positioning of the inner shell 22, while allowing the outer shell 28 to fully rotate. This ensures that the plurality of tires 21 can move while reducing the disturbances to the components located in the inner shell 22. Each of the inner shells 22 contains an axle 27, which spans the interior of the inner shell 22. The axle 27 supports many of the components inside the inner shell, specifically the orientation device 23 which is able to accurately account for its orientation due to the stable mounting.

In reference to FIG. 6, FIG. 7, FIG. 8, FIG. 9, FIG. 10, a major benefit of the Magno car is the ability to operate the car with only one hand. The present invention is controlled by a single control device 4, which comprises of a control stick 5, an accelerator button 6, a brake button 7, a levitation button 8, and a mounting device 9. The control device 4 is the interface through which the user can communicate with the vehicle. The control stick 5 is operated with one hand which fits around its body. The mounting device 9 comprises of a vertical piece 10, a horizontal piece 15, and a base piece 14. The vertical piece 10 and horizontal piece 15 both contain an inner shaft 12 and an outer shaft 13. The inner shaft 12 fits inside the outer shaft 13. The inner shaft 12 has a plurality of push button locks 11 on its surface. The outer shaft 13 has a plurality of holes 16 on its surface. The push button locks 11 fit into the holes 16, allowing the user to lock the position of the horizontal piece 15 and the vertical piece 10. Users can then push in the push button locks 11 to move the outer shaft 13 forwards or backwards to match a vacant hole with the push button locks 11 to adjust the positioning of the horizontal piece 15. The same can be done with the vertical piece 10 to move the outer shaft 13 up or down to adjust the positioning of the vertical piece 10. On one end, the horizontal piece is attached to the cabin 30, and on the other it is attached to the vertical piece 10. Through the use of the mounting device 9, both the height of the control device 4 and the distance it is away from the user can be adjusted, allowing for a degree of customizability for each individual user.

Figure 8:
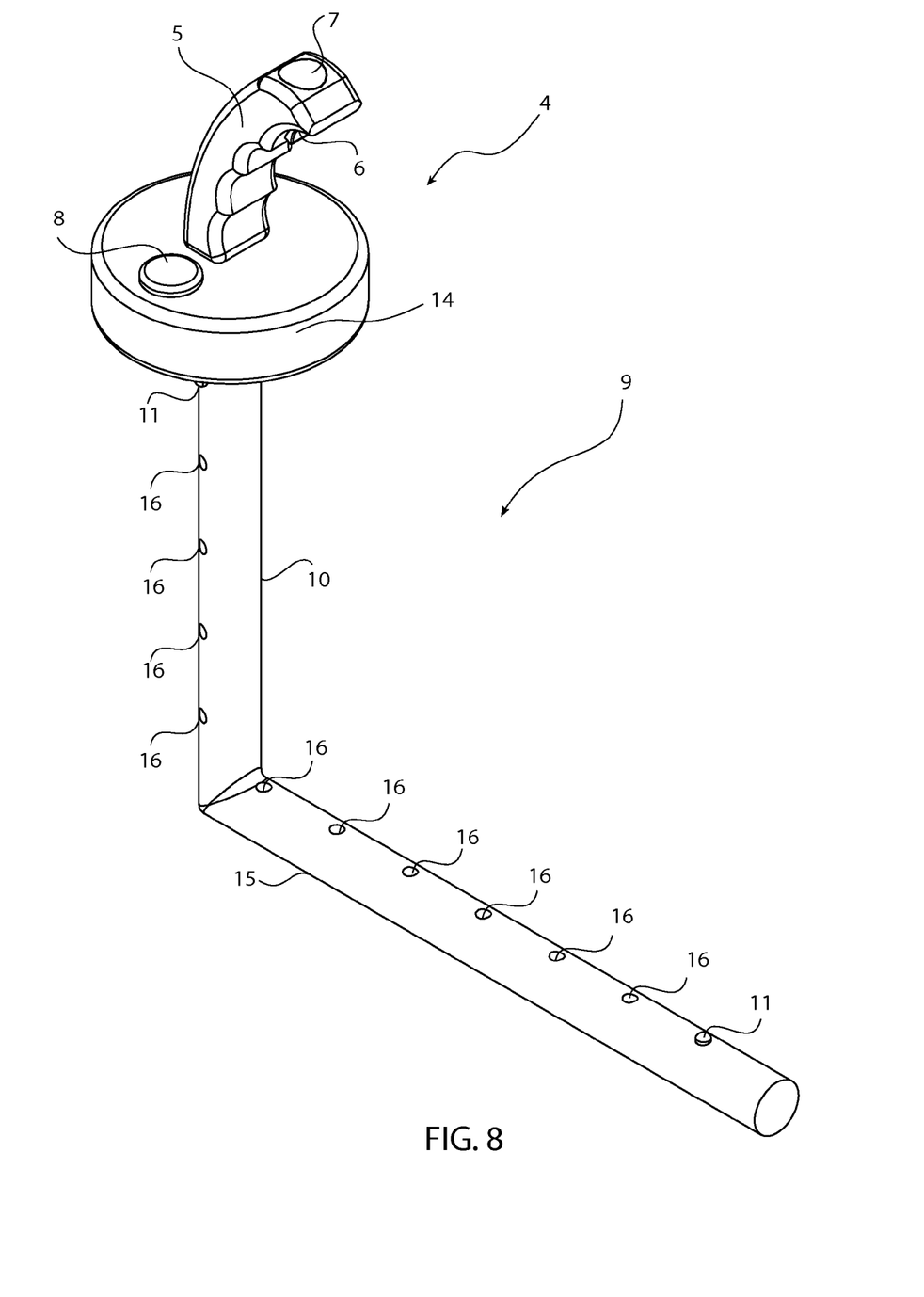
FIG. 8 is a perspective view of the mount system and control device.

Referring to FIG. 2 and FIG. 8, attached to the top of the vertical piece 10 is the base piece 14. The control stick 5 is attached on top of the base piece 14 which is shaped as a disk. The control stick 5 can pivot in any direction, this 360° functionality allows the user to control the direction the present invention is traveling. A sensor housed within the control stick 5 allows the user to read the pivot angle of the control stick 5. This will also help the user to understand how much more or less to pivot the control stick 5 based on driving and road conditions. Coupled with the spherical tires 21, this enables the present invention to roll in any direction depending on the inputs from the user. The pivoting movement is enabled by the control stick's 5 electrical connections (i.e. wires that are housing within the horizontal piece 15 and vertical piece 10) to the spherical tires 21. The connection between the two components allows the control stick 5 to control the propulsion system within the tires 21. As the control stick 5 is pushed in a certain direction, it will activate various sensors that are housed within the tires 21, which will begin influencing in which direction and as to what degree the spherical tires 21 will rotate.

Figure 9:
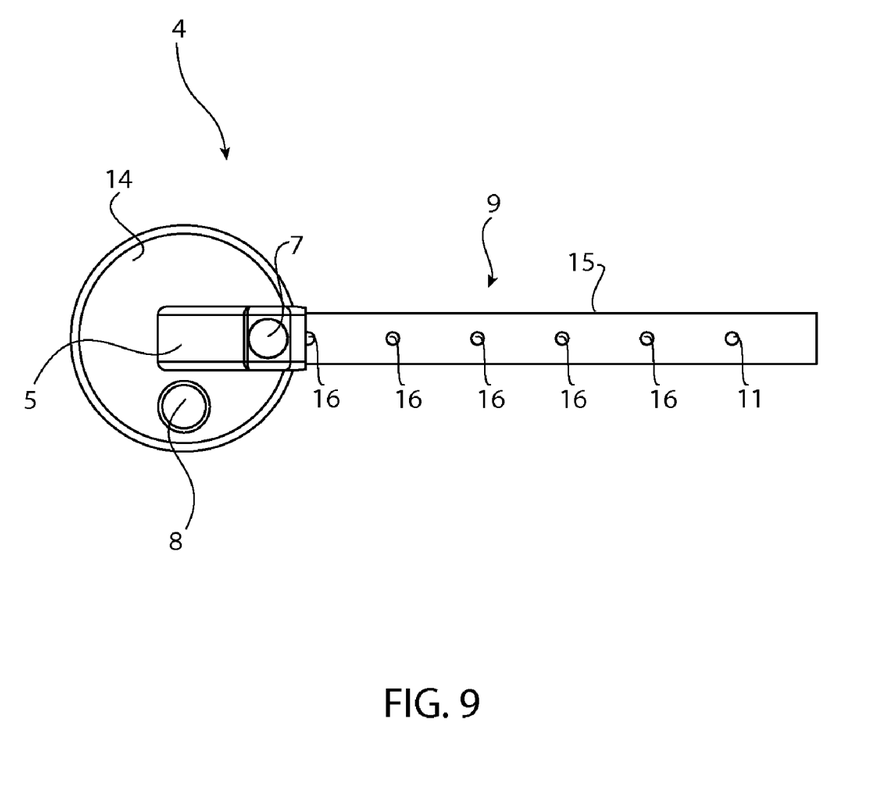
FIG. 9 is a top plane view of the mount system and control device.
Figure 10:
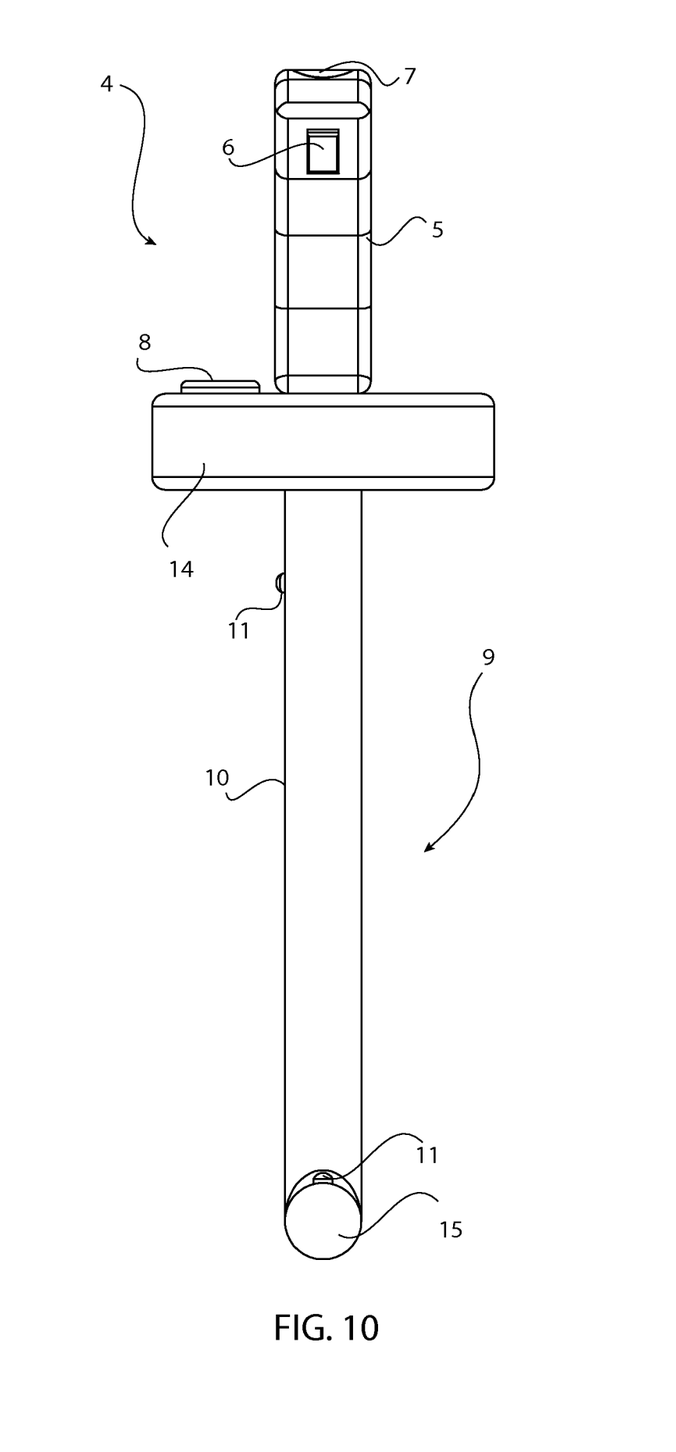
FIG. 10 is a front side view of the mount system and control device.
Figure 11:
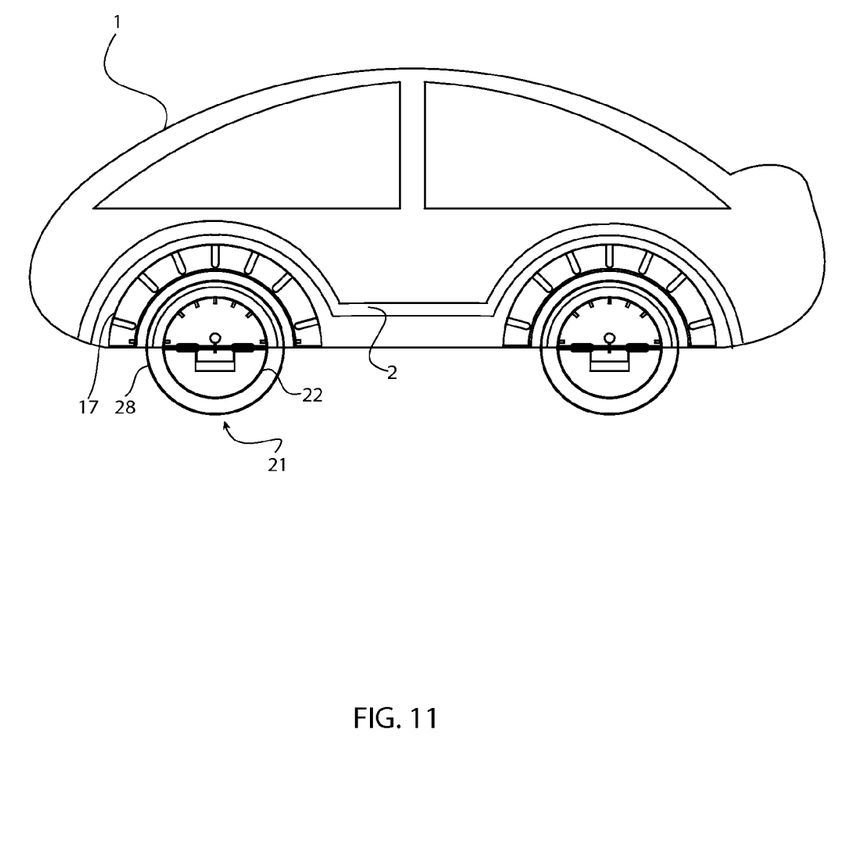
FIG. 11 is a side section view of the car.

Since drivers can use their vehicle for extended periods of time, it is important that the control device 4 is comfortable to hold. Gripping a stiff object can cause joint, grip, and arthritic problems. Also, it can be very tiring for the driver to grip an object for long periods of time. This can lead to careless handling of the control device 4 which would inevitably lead to a variety of accidents. To prevent mishandling of the control device 4, the body of the control stick 5 is ergonomically designed to fit the contours of the hand. The shape of the body allows for the control stick 5 to be comfortable to hold and operate while providing a solid grip. The accelerator button 6 is a trigger assembly which controls the changing speeds of the present invention. The trigger is located on the front surface of the control stick 5 and is operated by the pointer finger. To increase the speed of the present invention the driver squeezes the trigger.

In reference to FIG. 8 and FIG. 9, the brake button 7 of the control device 4 sits on the top surface of the control stick 5. The position of the brake button 7 is convenient in regards to how a hand will be positioned on the control stick 5. The control stick 5 is gripped by the hand, with the fingers working the accelerator 6, and the thumb free to operate the brake button 7. The style of the control stick's shape allows for there to be ample room for the thumb to maneuver around and press the brake button 7.

Referring to FIG. 8 and FIG. 9, accompanying the control stick 5 on the base 14 is the levitation button 8, which dictates whether the present invention is hovering above its tires 21 or whether the present invention is in contact with the ground. The levitation button 8 is an on/off switch for levitation, leaving no partial levitation feature. This button 8 draws similarities to the park feature in conventional automobiles. The levitation button 8 is only functional when the car has come to a complete stop after braking to delevitate, or when first starting the car up to begin levitation. This feature ensures that users are unable to delevitate while driving. Without this safety feature, drivers would have the ability to activate levitation/delevitation by easily pressing the levitation button 8 when their hands are near the base 14. This safety measure also prevents possible complications when delevitating while the car is still in motion.

Referring to FIG. 8, the design of the control device 4 helps alleviate the need to drive with two hands such as with a steering wheel. Presently, individuals with certain disabilities are not able to obtain their license, limiting their independence and mobility. Instead, they either have to rely on public transport or a driving service to help them get from one place to another. The present invention's one handed control device 4 aids individuals with certain disabilities in their mission to drive. Unlike traditional vehicles, the present invention has no systems controlled by the lower extremities since the accelerator 6 and brake 7 are located on the control device 4, which is controlled by the hands of the driver. This feature helps users of any height or individuals with disabilities in the lower appendages to use the present invention, making auxiliary modifications unnecessary. Regardless, the one handed design of the control device 4 and control stick 5 enables the car to be useful to a wide audience. In the present invention, the control device 4 is similar to a gaming joystick or an aircraft control stick. However, any alternative which allows the user to input the desired actions to the present invention is sufficient.

Figure 4:
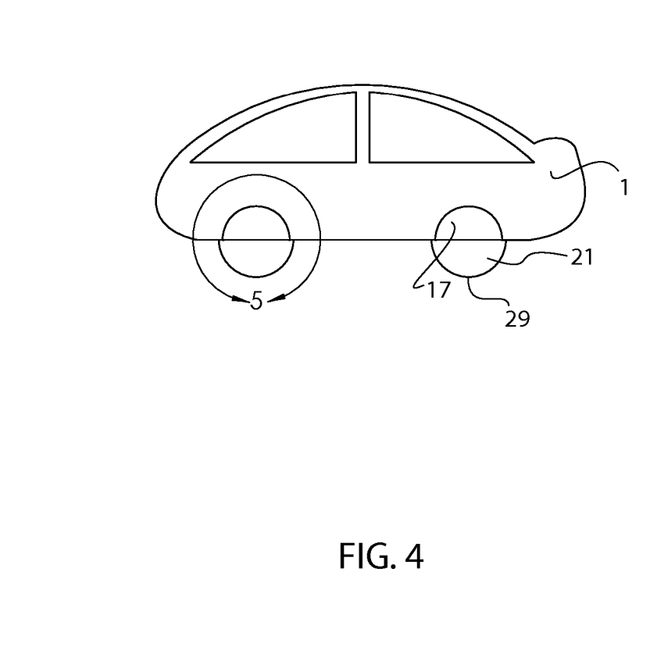
FIG. 4 is a side view of the present invention upon which a detail view is taken and shown in FIG. 5.
Figure 5:
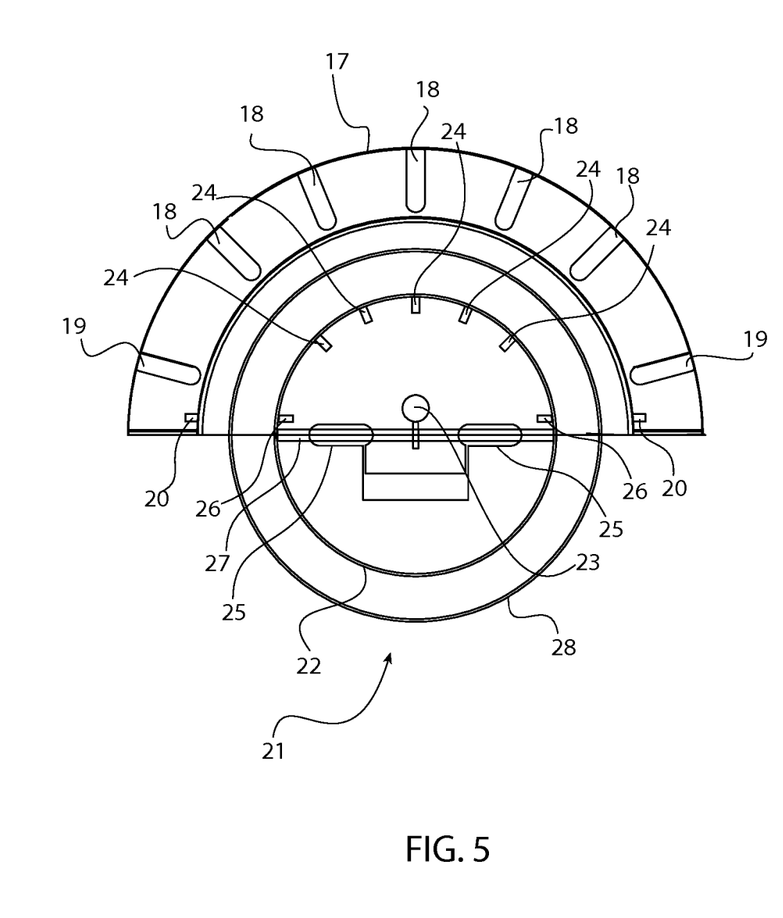
FIG. 5 is a detail view of the tire and tire chamber. The diagram shows the components and mechanisms involved with the tire and tire chamber.

In reference to FIG. 4 and FIG. 5, the levitation system is divided into two separate components that interact with each other to ensure that the vehicle can be lifted off of its tires 21. One of the major components located in the tire chambers 17 are a plurality of sensor and levitation electromagnet pairs 18.

Each sensor and electromagnet pair 18 is able to detect the position of a corresponding set of permanent levitation magnets 24. To determine the strength of the field produced by the electromagnet, in the current design, a Hall Effect sensor is used. The plurality of permanent levitation magnets 24 are placed inside of the inner shell 22, directly below the plurality of sensor and levitation electromagnet pairs 18. The interaction between the magnetic fields produced by these magnets 24 creates the levitation force required to raise the frame 1 up. The base of the vehicle frame 1 is lifted off the ground and above the tires 21, while the tires 21 remain on the ground, creating space between the tires 21 and the ceiling of the tire chambers 17. To maintain levitation, it is necessary for the permanent levitation magnets 24 and the sensor and levitation electromagnet pairs 18 to stay in the same position as much as possible. The sensor and levitation electromagnet pairs 18 need to be able to receive constant readings from the permanent levitation magnet 24 to ensure that the magnetic fields are kept constant throughout the use of the vehicle. Changes in the position of the permanent levitation magnets 24 will cause the sensor and levitation electromagnet pairs 18 to output different magnetic fields, and thus create different heights of levitation, and a bumpy ride. Consistent positioning ensures that the magnetic fields are kept constant and undisturbed, which in turn leads to a constant height of levitation. The levitation systems are located in all of the tires 21 and tire chambers 17 to ensure the present invention is balanced while levitated.

Referring to FIG. 5, through the use of an orientation device 23, the inner shell 22 will be able to stay upright so the plurality of permanent levitation magnets 24 are continuously positioned directly below the corresponding sensor and levitation electromagnet pairs 18 in the tire chambers 17. In its present design as a gyroscope, the orientation device 23 is attached to the axle 27, allowing its rotations to dictate the orientation of the tires 21. The batteries that power both the Hall Effect sensors and gyroscope are controlled wirelessly through the levitation button 8 on the control device 4. When the levitation button 8 is turned off, current is no longer supplied to the sensor and levitation electromagnet pairs 18 and the car stops levitating. Without a supply of current, the sensor and levitation electromagnet pairs 18, are no longer able to read the position of the permanent levitation magnets 24 and the governing magnetic fields dissipate.

Again, in reference to FIG. 5, the propulsion system of the present invention is managed by a plurality of propulsion electromagnets 19 located along the walls of the tire chambers 17, a plurality of permanent propulsion magnets 20 placed 360° around the lower portions of the tire chamber walls 17, and a plurality of sensor and propulsion electromagnet pairs 25 in the inner shell 22. The main concept behind the propulsion system is that motion is generated through the communication of the magnets through a series of magnetic fields. The magnitudes and orientations of these magnetic fields are governed by the magnitude and direction of current flow. The process begins by having the user input the direction and speed they desire. All inputs are managed by the control device 4, depending on the direction and application of the accelerator 6; varying amounts of current are applied to certain propulsion electromagnets 19 in the tire chambers 17. If the user presses the accelerator 6, there will be an increase of current flow, as a larger current is able to generate a larger magnetic field. The flow of current excites the propulsion electromagnets 19 of the tire chamber 17 to create magnetic fields which interact with the tires 22.

These generated magnetic fields are detected by the plurality of sensor and propulsion electromagnet pairs 25 in the inner shell 22. In the present invention, Hall Effect sensors produce a voltage and current when subjected to a change in magnetic flux. A large change in flux will result in a large generated voltage. By detecting the magnetic fields, the plurality of sensor and propulsion electromagnet pairs 25 consequently produce a new magnetic field with the generated voltage and current. Present within both the plurality of sensor and propulsion electromagnet pairs 25 and the plurality of sensor and levitation electromagnet pairs 18 are a series of differential amplifiers which magnify the output of the signal. This allows for larger magnetic fields to be generated. These fields are oriented to interact with the permanent propulsion magnets 20 along the tire chambers 17 by either creating an attracting or repelling force which in turn moves the present invention.

In reference to FIG. 4, FIG. 5, and FIG. 8, to generate motion, a series of electromagnets are used. If the present invention were to accelerate forward, the sensor and propulsion electromagnet pairs 25 of the inner shell 22 which create an attractive force on the back wall of the tire chambers 17 and a repulsive force on the front wall of the tire chambers 17, are excited. This will both push and pull the present invention forward, maximizing the tires 21 ability to move the vehicle. The generated magnetic fields will also apply a force on the tires 22 to cause them to rotate and roll along the surface. The orientation device 23 of the inner shell ensures that the plurality of sensor and propulsion electromagnet pairs 10 is always oriented in the same way. By keeping the orientation constant, the fields of the permanent propulsion magnets 20 and the permanent levitation magnets 24 will not cause changes in flux to alter the outputs of the plurality of sensor and propulsion electromagnet pairs 25. The constant orientation also ensures that the correct electromagnets are interacting with each other.

In reference to FIG. 5, in order for the present invention to turn, a small amount of current must run through the circuits. The driver moves the control device 4 around in different directions to indicate which direction to travel in. A more dramatic movement of the control device 4 will translate into a tighter turn. In a process identical to the propulsion system, current flow through the propulsion electromagnets 19 is induced by inputs from the control device 4, generating a magnetic field. The magnetic field is detected by the plurality of sensor and propulsion electromagnet pairs 25 and new magnetic fields are generated. These fields interact with the permanent propulsion magnets 20 to push and pull the vehicle in the desired direction. Despite its likeness to the propulsion system, the turning system uses much less current and is not large enough to noticeably accelerate the present invention. The turning system does not act as the primary method to accelerate and move the car, but is a system designed to align the vehicle to move in the desired direction. In the current design there is no actual physical link between the present invention and the wheels when the present invention is in motion. Along with the spherical tires 21, these features allow the user to turn the vehicle to travel in any direction on the road way.

Figure 6:
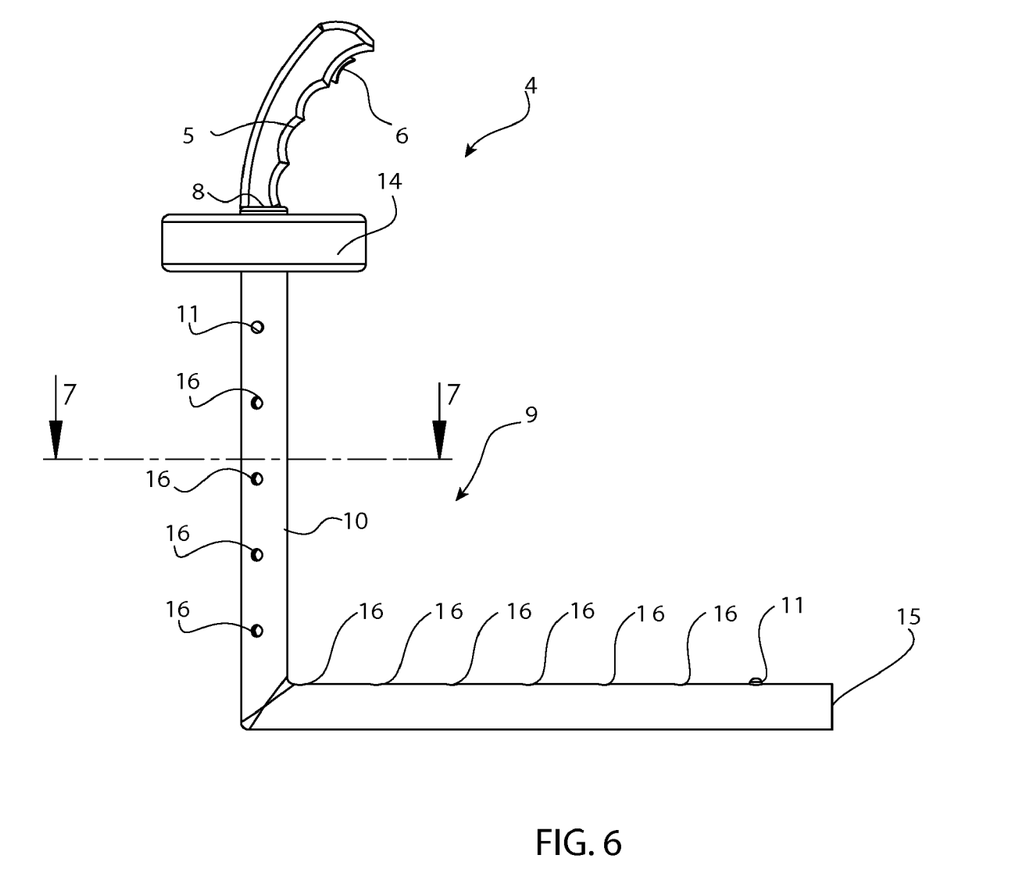
FIG. 6 is a side view of the mount system and control device upon which a section view is taken and shown in FIG. 10.
Figure 7:
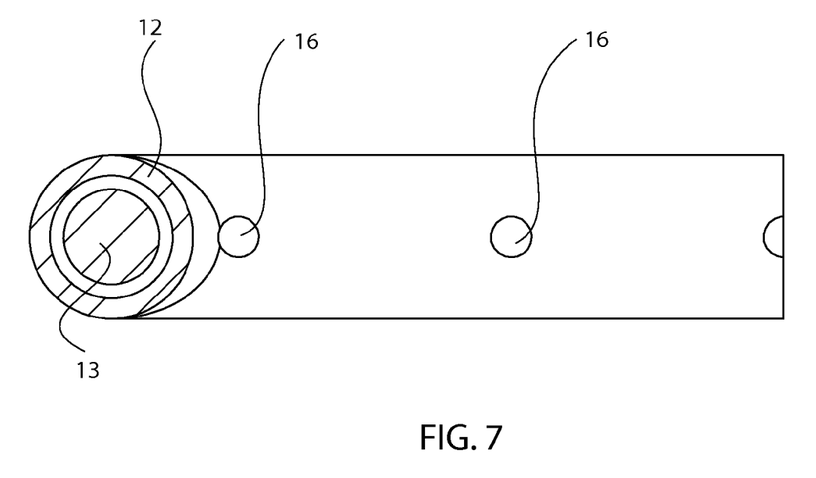
FIG. 7 is a section view of the mount system and control device. The diagram shows the components and mechanisms involved with the mount system and control device.

In reference to FIG. 5 and FIG. 6, to brake, the brake button 7 on the top surface of the control stick is pressed down. The brake button 7 works in harmony with an inertial navigation system which through the use of accelerometers and gyroscopes determines the direction and magnitude of the velocity the present invention is traveling at. When the brake button 7 is pushed down, the information gathered by the inertial navigation system results in the flow of current to certain propulsion electromagnets 19. The flow of current is oriented to generate magnetic fields which oppose the direction the present invention is traveling in. Each direction the present invention is traveling in has a preset current output to the propulsion electromagnets 19.

Referring to FIG. 5, for example, if the car was moving forward when the brake button 7 was used, the current flow will induce magnetic fields which cause the tires 21 to create an attractive force with the front surface of the tire chambers 17, and a repulsive force with the back surface of the tire chambers 17. The interactions between the tires 21 and the tire chambers 17 are the exact opposite from when the present invention was moving forward, resulting in the reduction of speed of the present invention, with the tires 21 pushing and pulling the present invention to slow it down by accelerating it backwards. Current flow stops when the vehicle speed is measured to have a velocity of zero by the inertial navigation system or when the brake button 7 has been let go. Without flowing current, no magnetic fields are generated to accelerate or decelerate the present invention, and in the absence of governing magnetic fields the vehicle stays at rest.

The inertial navigation system is constantly determining the direction the present invention is traveling in. This allows it to constantly change the current output depending on the motion of the present invention, so it can adjust to changing circumstances on the road. Thus, users are able to change the direction the present invention is traveling in while braking. When the car has come to a complete stop, the inertial navigation system will no longer receive any reading for its velocity and direction, eliminating all current flow in the system, preparing it for delevitation.

In reference to FIG. 5, the amount of current flow will be dictated by how far down the brake button 7 is pushed. If the user wants to come to an immediate stop the brake button 7 is pressed all the way down, this allows more current to flow and creates stronger magnetic fields. If the user wants to gradually reduce speed, minimal pressure is applied to the brake button 7, which results in less current and weaker magnetic fields. While, the direction of the current and determination of which propulsion electromagnets 19 are excited is governed by the outputs of the inertial navigation system, the amount of current that flows through the system is solely governed by the user's pressure on the brake button 7.

In reference to FIG. 6, the control device 4 also allows for another form of braking that occurs solely through the positioning of the control stick 5 and not the brake button 7. The user is able to slow down by moving the control stick 5 in the opposite direction that the vehicle is currently moving in to slow it down. If the vehicle is moving forward, the user can pull on the control stick 5 backwards, to brake. While the momentum of the car is moving it forward, magnetic fields are created which attempt to direct the car backwards. The forward motion of the car will gradually be canceled out by the backwards input from the control stick 5. The user can also use the accelerator button 6 with this method to bring the present invention to a quicker stop by accelerating the present invention backwards.

In reference to FIG. 4 and FIG. 5, another consideration of the design of the tires 21 and the tire chambers 17 is a mechanism to secure the tires 21 within the tire chambers 17 at all times. While the present invention is levitating there is no physical connection between the vehicle frame 1 and the tires 21. During operation, the tires 21 must be able to move the present invention with their generated magnetic fields without coming into physical contact with the walls of the tire chambers 17. If no system were in place, the tires 21 would bounce around the inner part of the tire chambers 17 and it would not be able to effectively move the vehicle because it would be in the incorrect position and unable to receive proper signals from the propulsion electromagnets 19. Other magnets would also be out of place, disrupting existing fields and creating new ones. Therefore, a safety system has been devised to ensure adequate space is maintained between the tires 21 and the tire chambers 17 along its horizontal plane, similar to the allotted space required for levitation between the tires 21 and the ceiling of the tire chambers 17.

In reference to FIG. 5, a series of permanent magnets on the tire chambers 17 and inner shell 22 are used to achieve this effect. The permanent propulsion magnets 20, located on the tire chambers 17, are used not only for propulsion but also to secure the tires 21 in the correct positions within the tire chambers 17. In the inner shell 22 are a plurality of permanent safety magnets 26, which are aligned to be level with the permanent propulsion magnets 20 when the vehicle is levitating. They are spaced 360 degrees around the horizontal plane of the tires 21. The permanent propulsion magnets 20 and permanent safety magnets 26 are oriented so that the same poles are facing each other. The interacting fields create a repulsive force. When the tires 21 are at the center of the tire chambers 17, there will be an equal repulsive force in all directions keeping it in place at the center, maintaining equilibrium. When the tires 21 shift out of place, the repulsive forces oriented opposite to the direction of motion will gradually increase as the distance between the tires 21 and the walls of the tire chambers 17 decreases. Similarly, the repulsive force that was pushing the tires 21 in the direction of motion will decrease due to the increase in distance. The new balance of forces will move the tires 21 back into the center of the tire chambers 17. While the car is moving, the tires 21 will constantly want to move out of place, this system ensures the tires 21 will stay in the center of the chambers 17 by allowing for continual adjustments depending on the exact location of the tires 21 by having different magnitudes of the repulsive forces act upon it.

In references to FIG. 1 and FIG. 14, the magnetic fields generated for the motion and levitation of the vehicle have a large magnitude and have the potential to interfere with electrical components and other objects in the cabin 30 of the vehicle. To counteract this interference, the undercarriage of the frame 1 has an electromagnetic shield 2. In the current design, the magnetic shielding is manufactured from aluminum foam. Properties of aluminum foam include low magnetic permeability and conductivity, which make it an ideal material to be used for the electromagnetic shield 2. The electromagnetic shield 2 reduces the effects of magnetic fields on the cabin 30 of the present invention. This also helps reduce the effects outside fields have on the functioning of the present invention. This material is able to prevent interference because as a conductor, when it is subjected to a magnetic field, electrons and charges within the aluminum begin to move and circulate, forming eddy currents. The motion of these charges generate a new magnetic field which opposes and is oriented opposite to the incoming field, the induced field is able to cancel the incoming field to keep the external field outside of the surface and remove its ability to penetrate the cabin of the present invention. When the present invention is turned off there will be no magnetic fields present, as a result, the eddy currents disappear because there is no magnetic field to oppose. This method allows occupants inside the car to use devices that are sensitive to magnetic fields, such as cell phones, as well as accommodate occupants with medical devices such as pacemakers. This foam also acts as an inhibitor to other forms of electromagnetic radiation, providing a safe cabin 30.

This material also has the added benefit of being an effective material at absorbing energy as an impact absorber. During a collision, the aluminum foam is able to absorb more energy than current conventional car materials because it is able to compress a considerable amount. The energy of the impact is converted into plastic deformation energy as it compresses. This material is also lightweight compared to other materials possessing similar qualities. This is an important factor to consider because it reduces the required magnitude of the magnetic fields to levitate and move the vehicle.

The above systems form and operate the present invention. Through magnetic interactions, the present invention is able to levitate above its own tires 21 while still maintaining its ability to move. While the invention has been described in its preferred embodiment, it is to be understood that a variety of possible modifications can be made to fulfill the purposes of the invention Although the invention has been explained in relation to its preferred embodiment, it is to be understood that many other possible modifications and variations can be made without departing from the spirit and scope of the invention as hereinafter claimed.

What is claimed is:

1. A magnetically levitating vehicle comprises,
a frame;
a control device;
a plurality of tire chambers;
a plurality of tires;
the frame comprises of a magnetic shield, a cabin, and a under carriage guard;
the magnetic shield being positioned inside of the frame and surrounding the plurality of tire chambers; and
the undercarriage guard being positioned underneath the frame.

2. As claimed in claim 1, the magnetically levitating vehicle comprises,
the control device comprises of a control stick, and a mounting system;
the control stick comprises of an accelerator button, a levitation button, and a brake button;
the accelerator button and the brake button being positioned on exterior surfaces of the control stick;
the mounting system comprises of a horizontal piece, a vertical piece, a base piece, and a plurality of push button locks; and
the levitation button being positioned on the base piece.

3. As claimed in claim 2, the magnetically levitating vehicle comprises,
the horizontal piece being affixed on one end to the cabin;
the vertical piece being attached to the horizontal piece;
the base piece being positioned on top of the vertical piece; and
the control stick pivoting on top of the base piece.

4. As claimed in claim 2, the magnetically levitating vehicle comprises,
the vertical piece and horizontal piece both comprise of an inner shaft and an outer shaft;
the inner shaft being positioned within the outer shaft;
the outer shaft comprises of a plurality of holes;
the plurality of push button locks having matching diameters to the plurality of holes; and
the plurality of push button locks fitting into the plurality of holes.

5. As claimed in claim 1, the magnetically levitating vehicle comprises,
the plurality of tire chambers comprises of a plurality of sensor and levitation electromagnet pairs, a plurality of propulsion electromagnets, a plurality of permanent propulsion magnets;
the plurality of tire chambers being hollow hemispheres; and
the plurality of tire chambers being located underneath the frame.

6. As claimed in claim 5, the magnetically levitating vehicle comprises,
the plurality of sensor and levitation electromagnet pairs being positioned inside the tire chamber and above the plurality of tires;
the plurality of propulsion electromagnets being positioned radially around the tire chamber;
the plurality permanent propulsion magnets being positioned radially around the tire chamber;
the plurality of sensor and levitation electromagnet pairs being controlled by the levitation button; and
the plurality propulsion electromagnets being controlled by the accelerator button and brake button.

7. As claimed in claim 1, the magnetically levitating vehicle comprises,
the plurality of tires comprises of an inner shell and an outer shell.
the plurality of tires being located underneath the plurality of tire chambers;
the plurality of tires being smaller in diameter than the plurality of tire chambers; and
the inner shell being located within the outer shell.

8. As claimed in claim 7, the magnetically levitating vehicle comprises,
the inner shell comprises of an orientation device, a plurality of permanent levitation magnets, a plurality of sensor and propulsion electromagnet pairs, a plurality of permanent safety magnets, and an axle;
the outer shell comprises of a tire tread;
the tires tread encompassing the outer shell;
the axle spanning the inner shell;
the plurality of sensor and propulsion electromagnet pairs being suspended by the axle; and
the orientation device being mounted on the axle.

9. As claimed in claim 8, the magnetically levitating vehicle comprises,
the plurality of permanent levitation magnets being aligned to interact with the plurality of sensor and levitation electromagnet pairs;
the plurality of sensor and propulsion electromagnet pairs being aligned to interact with the plurality of propulsion electromagnets and the plurality of permanent propulsion magnets; and
the plurality of permanent safety magnets being oriented to interact with the plurality of permanent propulsion magnets.

10. As claimed in claim 7, the magnetically levitating vehicle comprises,
the inner shell comprises of an orientation device, a plurality of permanent levitation magnets, a plurality of sensor and propulsion electromagnet pairs, a plurality of permanent safety magnets, and an axle;
the outer shell comprises of a tire tread;
the tires tread encompassing the outer shell;
the axle spanning the inner shell;
the plurality of sensor and propulsion electromagnet pairs being suspended by the axle;
the orientation device being mounted on the axle;
the plurality of permanent levitation magnets being aligned to interact with the plurality of sensor and levitation electromagnet pairs;

the plurality of sensor and propulsion electromagnet pairs being aligned to interact with the plurality of propulsion electromagnets and the plurality of permanent propulsion magnets; and the plurality of permanent safety magnets being oriented to interact with the plurality of permanent propulsion magnets.

11. A magnetically levitating vehicle comprises, a frame;

a control device;

a plurality of tire chambers;

a plurality of tires;

the frame comprises of a magnetic shield, a cabin, and a under carriage guard;

the magnetic shield being positioned inside of the frame and surrounding the plurality of tire chambers;

the undercarriage guard being positioned underneath the frame;

the control device comprises of a control stick, and a mounting system;

the control stick comprises of an accelerator button, a levitation button, and a brake button;

the accelerator button and the brake button being positioned on exterior surfaces of the control stick;

the mounting system comprises of a horizontal piece, a vertical piece, a base piece, and a plurality of push button locks; and the levitation button being positioned on the base piece.

12. As claimed in claim 11, the magnetically levitating vehicle comprises, the plurality of tire chambers comprises of a plurality of sensor and levitation electromagnet pairs, a plurality of propulsion electromagnets, a plurality of permanent propulsion magnets;

the plurality of tire chambers being hollow hemispheres;

the plurality of tire chambers being located underneath the frame;

the plurality of tires comprises of an inner shell and an outer shell;

the plurality of tires being located underneath the plurality of tire chambers;

the plurality of tires being smaller in diameter than the plurality of tire chambers; and the inner shell being located within the outer shell.

13. As claimed in claim 12, the magnetically levitating vehicle comprises, the plurality of sensor and levitation electromagnet pairs being positioned inside the tire chamber and above the plurality of tires;

the plurality of propulsion electromagnets being positioned radially around the tire chamber;

the plurality permanent propulsion magnets being positioned radially around the tire chamber;

the plurality of sensor and levitation electromagnet pairs being controlled by the levitation button; and the plurality propulsion electromagnets being controlled by the accelerator button and brake button.

14. As claimed in claim 11, the magnetically levitating vehicle comprises, the horizontal piece being affixed on one end to the cabin;

the vertical piece being attached to the horizontal piece;

the base piece being positioned on top of the vertical piece;

the control stick pivoting on top of the base piece;

the vertical piece and horizontal piece both comprise of an inner shaft and an outer shaft;

the inner shaft being positioned within the outer shaft;

the outer shaft comprises of a plurality of holes;

the plurality of push button locks having matching diameters to the plurality of holes; and the plurality of push button locks fitting into the plurality of holes.

15. A magnetically levitating vehicle comprises, a frame;

a control device;

a plurality of tire chambers;

a plurality of tires;

the frame comprises of a magnetic shield, a cabin, and a under carriage guard;

the magnetic shield being positioned inside of the frame and surrounding the plurality of tire chambers;

the undercarriage guard being positioned underneath the frame;

the control device comprises of a control stick, and a mounting system;

the control stick comprises of an accelerator button, a levitation button, and a brake button;

the accelerator button and the brake button being positioned on exterior surfaces of the control stick;

the mounting system comprises of a horizontal piece, a vertical piece, a base piece, and a plurality of push button locks;

the levitation button being positioned on the base piece;

the plurality of tire chambers comprises of a plurality of sensor and levitation electromagnet pairs, a plurality of propulsion electromagnets, a plurality of permanent propulsion magnets;

the plurality of tire chambers being hollow hemispheres;

the plurality of tire chambers being located underneath the frame;

the plurality of tires comprises of an inner shell and an outer shell;

the plurality of tires being located underneath the plurality of tire chambers;

the plurality of tires being smaller in diameter than the plurality of tire chambers;

the inner shell being located within the outer shell;

the horizontal piece being affixed on one end to the cabin;

the vertical piece being attached to the horizontal piece;

the base piece being positioned on top of the vertical piece;

the control stick pivoting on top of the base piece;

the vertical piece and horizontal piece both comprise of an inner shaft and an outer shaft;

the inner shaft being positioned within the outer shaft;

the outer shaft comprises of a plurality of holes;

the plurality of push button locks having matching diameters to the plurality of holes;

the plurality of push button locks fitting into the plurality of holes;

the plurality of sensor and levitation electromagnet pairs being positioned inside the tire chamber and above the plurality of tires;

the plurality of propulsion electromagnets being positioned radially around the tire chamber;

the plurality permanent propulsion magnets being positioned radially around the tire chamber;

the plurality of sensor and levitation electromagnet pairs being controlled by the levitation button;

the plurality propulsion electromagnets being controlled by the accelerator button and brake button;

the inner shell comprises of an orientation device, a plurality of permanent levitation magnets, a plurality of sensor and propulsion electromagnet pairs, a plurality of permanent safety magnets, and an axle;

the outer shell comprises of a tire tread;

the tires tread encompassing the outer shell;
the axle spanning the inner shell;
the plurality of sensor and propulsion electromagnet pairs being suspended by the axle;
the orientation device being mounted on the axle;
the plurality of permanent levitation magnets being aligned to interact with the plurality of sensor and levitation electromagnet pairs;

the plurality of sensor and propulsion electromagnet pairs being aligned to interact with the plurality of propulsion electromagnets and the plurality of permanent propulsion magnets; and
the plurality of permanent safety magnets being oriented to interact with the plurality of permanent propulsion magnets.

* * * * *